P. N. MAINE.
Mail-Bag Catcher.
No. 57,936.
Patented Sept. 11, 1866.
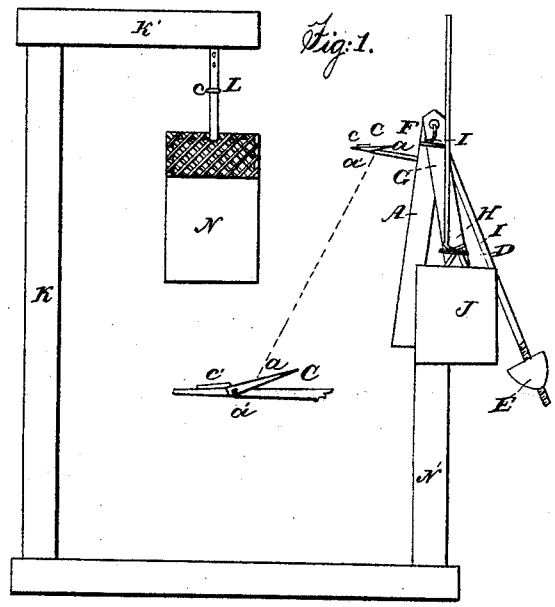
Fig. 1.
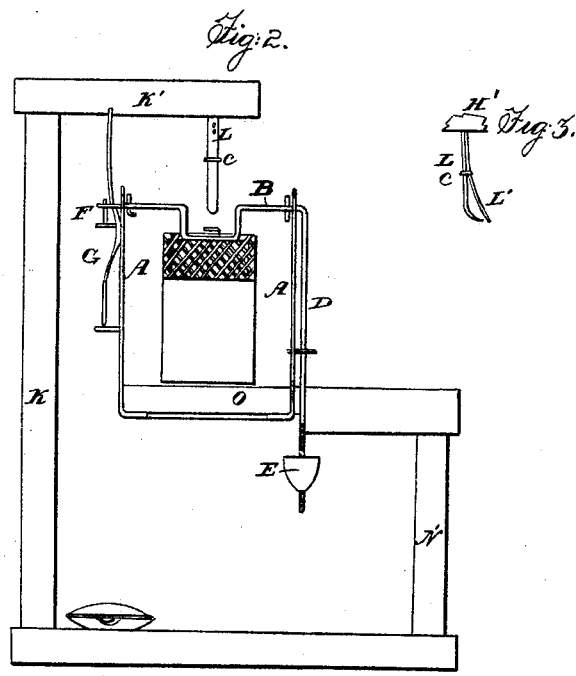
Fig. 2.
Fig. 3.
Witnesses
Inventor
Dr. Peter N. Maine

UNITED STATES PATENT OFFICE.

PETER N. MAINE, OF OLMSTED FALLS, OHIO.

IMPROVED METHOD OF RECEIVING AND DELIVERING MAIL-BAGS ON RAILWAY-CARS.

Specification forming part of Letters Patent No. 57,936, dated September 11, 1866.

*To all whom it may concern:*

Be it known that I, P. N. MAINE, of Olmsted Falls, in the county of Cuyahoga and State of Ohio, have invented certain new and useful Improvements in an Apparatus for Receiving and Discharging Railroad-Mail, &c.; and I do hereby declare that the following is a full and complete description of the construction and operation of the same, reference being had to the accompanying drawings, making a part of this specification, in which—

Figure 1 is an end view of the apparatus. Fig. 2 is a side view of the same. Fig. 3 is a detached section that will be referred to in the description.

Like letters refer to like parts in the views.

A represents a frame, which can be constructed of iron or other suitable material. Extending across the top and passing through the sides of this frame is a shaft, B, which is bent in the middle in a rectangular form, for a purpose hereinafter shown. From the middle of this shaft projects a barbed hook, C, Fig. 1. The barb $a$ of this hook is connected to the stem or shank by a pivot-joint at $a'$, by the means of which the barb can be pressed down close upon the shank. On the end of this shank is a spring, $c'$, one end of which rests on the end of the barb, which is for the purpose of keeping the other end of the hook up or open, as shown in the drawings.

One end of the shaft B, after passing through the side A of the frame, is bent at right angles, and extends down, forming a long arm, D, on the end of which is screwed the weight E. The other end of the shaft, after passing through the side, terminates in a hook, F.

Pivoted to one side of the frame is a lever, G, the lower end of which forms a hook, H.

I I' are staples connected to the frame. J is a mail-bag hung upon the hook H, the handle passing up through a slot in said staple, which staple is to prevent the bag from slipping off the hook. K represents a post on the platform, an arm, K', projecting out from it, as shown. To the under side of this arm is connected a hook, L, a side view of which is shown in Fig. 3. To the side of this hook is a spring, L', a band, $c$, passing round both, which can be moved up or down, as desired. The weight of the bag hanging on the hook might force the spring out, and thus fall. By pushing this band down the spring is held firmly down, and the bag cannot fall. The upper end or mouth of this bag N, which is hung on the hook L, is made like a coarse net-work, referred to hereinafter.

Having thus described the several parts of this apparatus and its construction, I will now explain the manner of operating it, which is as follows:

The arm O, frame A, and its connections, are supposed to be attached inside of the approaching car, the post K, as stated, on the platform at the station. Before the train reaches the station the arm O is swung out of the car, being pivoted to the top of the post N', or, as may be desired, in the car, and the bag N to be received hung on the hook L. As the train passes along the hook C, above described, passes through the meshes of the bag and carries it from the hook L. At the same time it is prevented from falling from the hook C by the barb $a$, above referred to, the spring $c'$ forcing the end of the barb up, as stated. The bag is thus received by the passing train, and the arm O, with the frame A, can be swung round into the car and the bag removed.

During the passing of the train the bag J is dropped upon the platform of the station by the upper arm of the lever G striking against the projecting arm K'. This throws the other end of the lever back, forcing the hook on the end of said lever out of the handles of the bag, when it will drop, as above stated.

A bag can be hung on the hook F, instead of on the one just described, or one on each hook, and the one on hook F be dropped, as follows: The hook, as above stated, is connected to the end of the shaft B, is kept in the position shown in Fig. 1 by the weighted arm D, the weight E being screwed on so as to be adjustable according to the weight of the bag. When the bag N has been taken upon the hook C the momentum caused by the removal of the bag from the hook L, together with the weight of said bag when upon the hook C, causes the shaft B to turn, and in so doing draws the hook out from the bag, and thereby allows it to fall to the ground. At the same time the bag J is dropped and bag N received.

What I claim as my improvement, and desire to secure by Letters Patent, is—

1. The adjustable hook C, pivoted to the shank, and spring $c'$, in combination with spring-hook L, the shaft B, weighted arm D, hook F, and staple I', as and for the purpose set forth.

2. The shaft B, in combination with the arm O, frame A, lever G, and staple I, arranged as and for the purpose set forth.

PETER N. MAINE.

Witnesses:
    W. H. BURRIDGE,
    J. HOLMES.